US012682485B2

(12) United States Patent
Dimitrov et al.

(10) Patent No.: US 12,682,485 B2
(45) Date of Patent: Jul. 14, 2026

(54) IDENTIFICATION OF OUT-OF-STOCK PRODUCTS

(71) Applicant: Target Brands, Inc., Minneapolis, MN (US)

(72) Inventors: Antonio Dimitrov, Anoka, MN (US); Neha Admal, Nashville, TN (US); John M. Mulligan, Brooklyn Park, MN (US)

(73) Assignee: Target Brands, Inc., Minneapolis, MN (US)

( * ) Notice: Subject to any disclaimer, the term of this patent is extended or adjusted under 35 U.S.C. 154(b) by 523 days.

(21) Appl. No.: 18/143,304

(22) Filed: May 4, 2023

(65) Prior Publication Data

US 2024/0371030 A1     Nov. 7, 2024

(51) Int. Cl.
| | |
|---|---|
| *G06T 7/73* | (2017.01) |
| *G06Q 10/087* | (2023.01) |
| *G06T 3/4038* | (2024.01) |
| *G06T 5/80* | (2024.01) |
| *G06T 7/33* | (2017.01) |
| *G06V 20/60* | (2022.01) |

(52) U.S. Cl.
CPC ............. *G06T 7/74* (2017.01); *G06Q 10/087* (2013.01); *G06T 3/4038* (2013.01); *G06T 5/80* (2024.01); *G06T 7/337* (2017.01); *G06V 20/60* (2022.01); *G06T 2207/20212* (2013.01); *G06T 2207/30204* (2013.01)

(58) Field of Classification Search
CPC ........... G06T 7/74; G06T 3/4038; G06T 5/80; G06T 7/337; G06T 2207/20212; G06T 2207/30204; G06Q 10/087; G06V 20/60; G06F 18/22
See application file for complete search history.

(56) References Cited

U.S. PATENT DOCUMENTS

| | | | | |
|---|---|---|---|---|
| 9,159,047 | B2 | 10/2015 | Winkel | |
| 10,607,182 | B2 | 3/2020 | Shah et al. | |
| 10,769,582 | B2 | 9/2020 | Williams et al. | |
| 2009/0063307 | A1* | 3/2009 | Groenovelt | G06Q 10/087 705/28 |
| 2016/0073102 | A1* | 3/2016 | Meloun | G06T 7/80 348/187 |
| 2018/0322448 | A1 | 11/2018 | Nemati et al. | |

(Continued)

OTHER PUBLICATIONS

Belongie, S. (2004). CSE 252B: Computer Vision II Lecture 4 Planar Scenes and Homography 4.1. Points on Planes. https://cseweb. ucsd.edu/classes/sp04/cse252b/notes/lec04/lec4.pdf (Year: 2004).*

(Continued)

*Primary Examiner* — Gregory A Morse
(74) *Attorney, Agent, or Firm* — Merchant & Gould, P.C.

(57) ABSTRACT

The present disclosure relates to a fixture overlay algorithm that identifies the out-of-stock product by relying on shelf fixture start and end coordinate data points on an image to map the captured image to pre-existing planogram data. The present fixture overlay disclosure detects the start and stop shelf fixture positions for each of the shelves within the shelf image and uses the detected shelf fixture points to map the shelf image to the planogram coordinates in order to determine the identity of the out-of-stock product.

20 Claims, 7 Drawing Sheets

(56)        References Cited

U.S. PATENT DOCUMENTS

2021/0031250 A1      2/2021  Borys et al.
2021/0398318 A1*   12/2021  Deng  ........................ G06T 7/11

OTHER PUBLICATIONS

Isern, J. (2019). GitHub—JuanlsernGhosn/homography-calibrator. GitHub. https://github.com/JuanlsernGhosn/homography-calibrator (Year: 2019).*

Vavra, V., Sattler, T., & Kukelova, Z. (2024). Camera Pose Estimation from Bounding Boxes. 2024 IEEE/RSJ International Conference on Intelligent Robots and Systems (IROS), 5535-5542. https://doi.org/10.1109/iros58592.2024.10801546 (Year: 2024).*

* cited by examiner

100
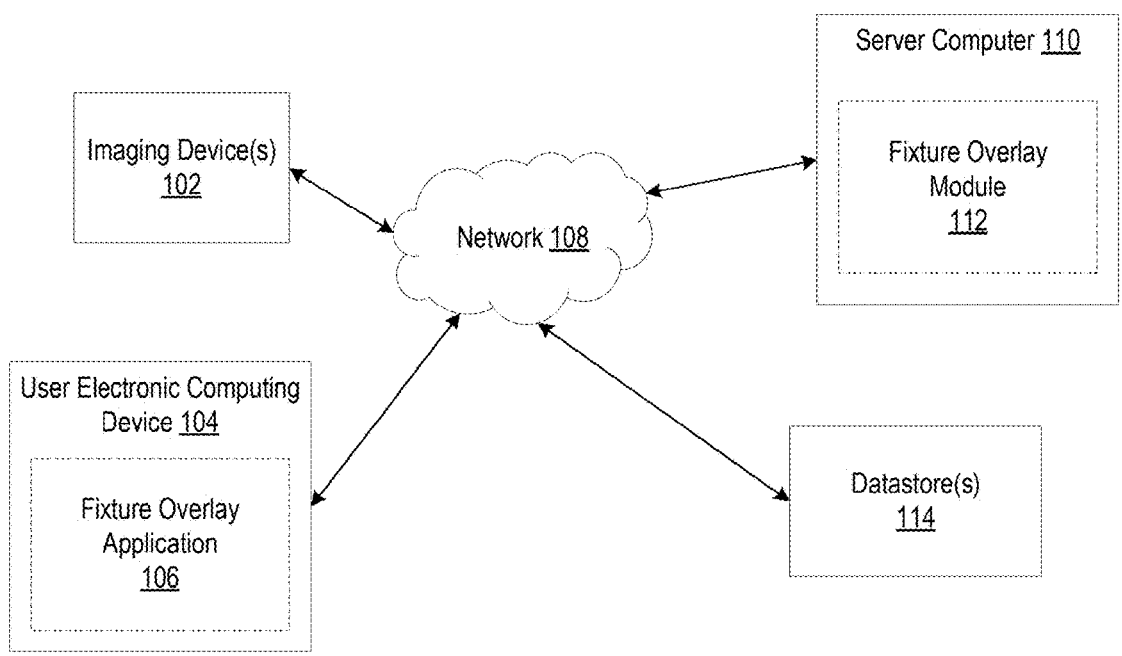
FIG. 1

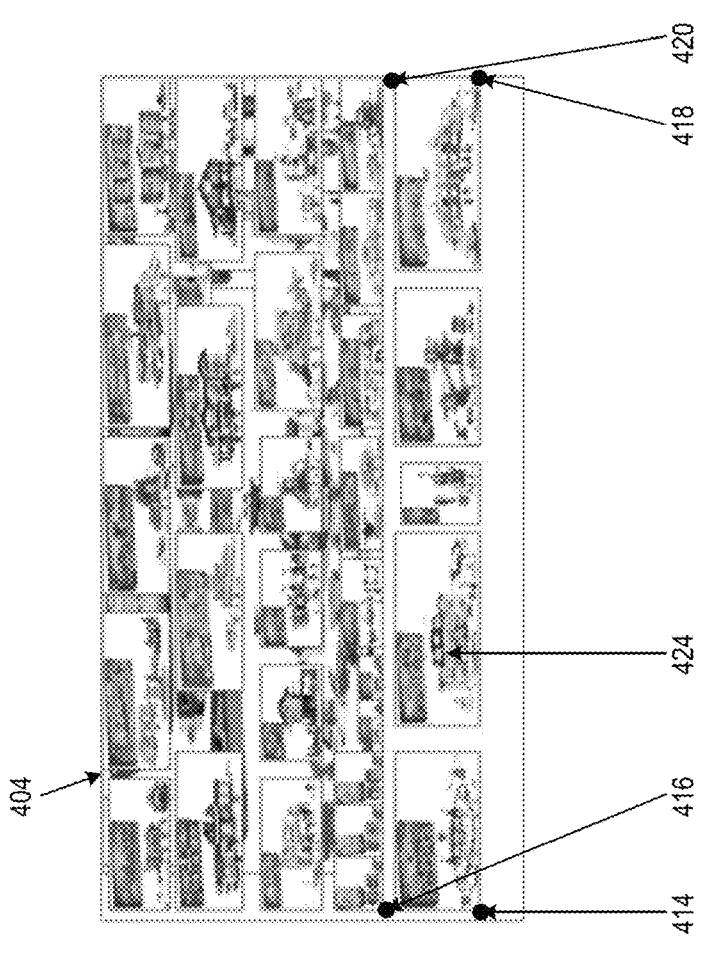
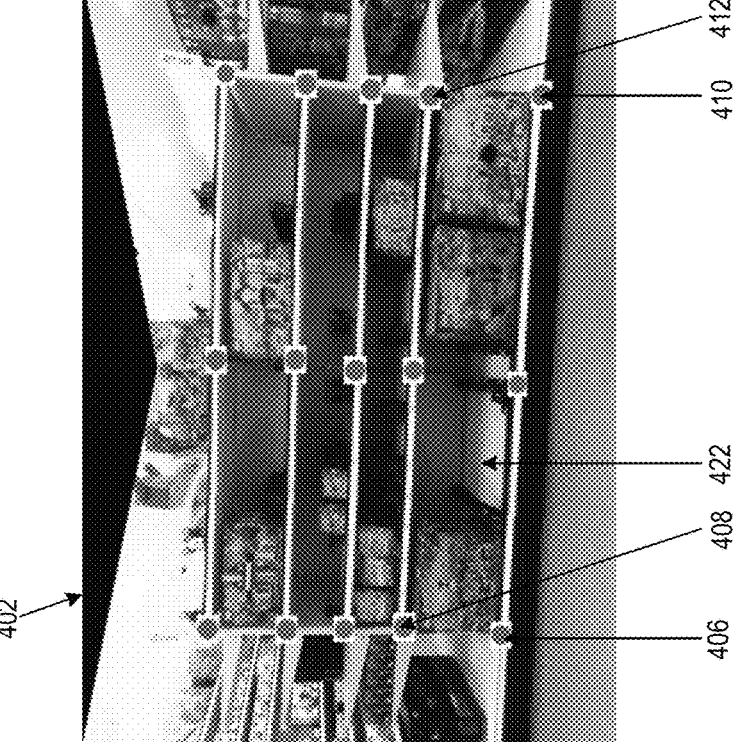
FIG. 4

500
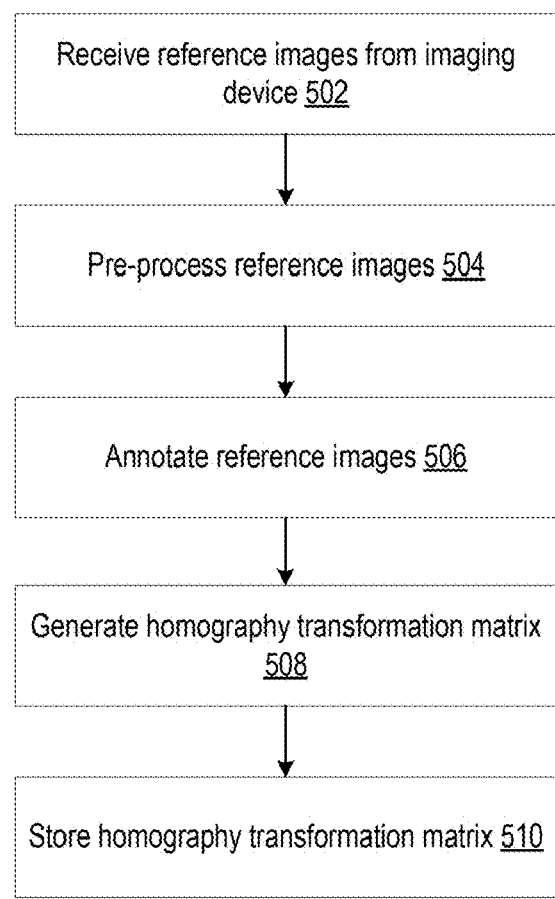
Receive reference images from imaging device 502
Pre-process reference images 504
Annotate reference images 506
Generate homography transformation matrix 508
Store homography transformation matrix 510
FIG. 5

600

```
┌─────────────────────────────────────┐
│ Receive images from imaging device 602 │◄────────────────────┐
└─────────────────────────────────────┘                       │
                    │                                          │
                    ▼                                          │
┌─────────────────────────────────────┐                       │
│        Pre-process Images 604         │                       │
└─────────────────────────────────────┘                       │
                    │                                          │
                    ▼                                          │
┌─────────────────────────────────────┐                       │
│ Detect products/empty shelf spaces on pre- │                  │
│         processed image 606           │                       │
└─────────────────────────────────────┘                       │
                    │                                          │
                    ▼                                          │
┌─────────────────────────────────────┐  Yes  ┌────────────────────────────────────┐
│ Detect whether there are shifts in imaging │──────►│ Re-generate and store homography   │
│             device 608                │       │ transformation matrix 610          │
└─────────────────────────────────────┘       └────────────────────────────────────┘
                    │                                          │
                   No                                          │
                    ▼                                          │
┌─────────────────────────────────────┐                       │
│ Retrieve homography transformation matrix │                  │
│                 612                   │                       │
└─────────────────────────────────────┘
                    │
                    ▼
┌─────────────────────────────────────┐
│    Identify out-of-stock product 614  │
└─────────────────────────────────────┘
                    │
                    ▼
┌─────────────────────────────────────┐
│ Send notification to alert user to re-stock │
│            product 616                │
└─────────────────────────────────────┘
```

FIG. 6

IDENTIFICATION OF OUT-OF-STOCK PRODUCTS

BACKGROUND

In general, stores display retail products and grocery items on store shelves for customer selection. According to a nationwide survey commissioned by a leading provider of retail and category optimization solutions, nearly 70% of U.S. adults would avoid shopping at a store if they encountered empty shelves. Retailers expend significant resources to ensure that store shelves are well-stocked. For example, retailers may periodically require employees to visually inspect shelves throughout the day and ensure that missing are replenished, or misplaced items are returned. Visual inspections can be labor-intensive, time-consuming and inconsistent.

SUMMARY

Examples provided herein are directed to identifying out-of-stock products within an image of a retail store shelf.

According to one aspect, a method for determining an identity of an out-of-stock product within a shelf image is disclosed. The method comprises: receiving the shelf image from an imaging device; retrieving, from a data store, a planogram image that corresponds to the shelf image; retrieving, from the data store, a homography transformation matrix that maps the shelf image to the planogram image; detecting one or more empty shelf spaces within the shelf image; for each empty shelf space of the one or more empty shelf spaces, determining an image coordinate corresponding to the empty shelf space, wherein the image coordinate is an x-y coordinate corresponding to the position of the empty shelf space within the shelf image; determining a planogram coordinate within the planogram image that corresponds to the image coordinate from the shelf image by applying the homography transformation matrix to the image coordinate; and determining the identity of the out-of-stock product associated with the empty shelf space by determining a product identifier associated with the planogram coordinate.

According to another aspect, a system for determining an identity of an out-of-stock product within a shelf image is disclosed. The system comprises: an imaging device; a computing system comprising: a processor; and a memory communicatively connected to the processor which stores program instructions executable by the processor, wherein, when executed, the program instructions cause the system to: receive the shelf image from the imaging device; retrieve, from a data store, a planogram image that corresponds to the shelf image; retrieve, from the data store, a homography transformation matrix that maps the shelf image to the planogram image; detect one or more empty shelf spaces within the shelf image; for each empty shelf space of the one or more empty shelf spaces, determine an image coordinate corresponding to the empty shelf space, wherein the image coordinate is an x-y coordinate corresponding to the position of the empty shelf space within the shelf image; determine a planogram coordinate within the planogram image that corresponds to the image coordinate from the shelf image by applying the homography transformation matrix to the image coordinate; and determine the identity of the out-of-stock product associated with the empty shelf space by determining a product identifier associated with the planogram coordinate.

According to yet another aspect, a system to alert a user to re-stock an out-of-stock product within a retail store shelf. The system comprises: an imaging device; a user electronic computing device; a computing system comprising: a processor; and a memory communicatively connected to the processor which stores program instructions executable by the processor, wherein, when executed, the program instructions cause the system to: receive a reference shelf image from the imaging device during initial setup of the imaging device; cause the display of the reference shelf image on the user electronic computing device; receive, at the user electronic computing device, a plurality of manual annotations, wherein each annotation marks a shelf fixture location within the reference shelf image; for each of the plurality of annotations, identify a corresponding location within a planogram image; calculate a homography transformation matrix by mapping the reference shelf image with the plurality of annotations to the planogram image; and receive a shelf image from the imaging device; detect one or more empty shelf spaces within the shelf image; for each empty shelf space of the one or more empty shelf spaces, determine an image coordinate corresponding to the empty shelf space, wherein the image coordinate is an x-y coordinate corresponding to the position of the empty shelf space within the shelf image; determine a planogram coordinate within the planogram image that corresponds to the image coordinate from the shelf image by applying the homography transformation matrix to the image coordinate; determine the identity of the out-of-stock product associated with the empty shelf space by determining a product identifier associated with the planogram coordinate; and send a notification to the user electronic computing device to alert the user to re-stock the out-of-stock product, wherein the notification includes the product identifier.

The details of one or more techniques are set forth in the accompanying drawings and the description below. Other features, objects, and advantages of these techniques will be apparent from the description, drawings, and claims.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

FIG. 1 illustrates an example fixture overlay system.

FIG. 4 illustrates an example side-by-side comparison of an annotated shelf image 402 and an example planogram image as used by the fixture overlay system of FIG. 1 during a planogram mapping process.

FIG. 5 illustrates an example method of generating a homography transformation matrix using the fixture overlay system of FIG. 1.

FIG. 6 illustrates an example method of identifying an out-of-stock product using the fixture overlay system 100 of FIG. 1.

DETAILED DESCRIPTION

Figure 2:
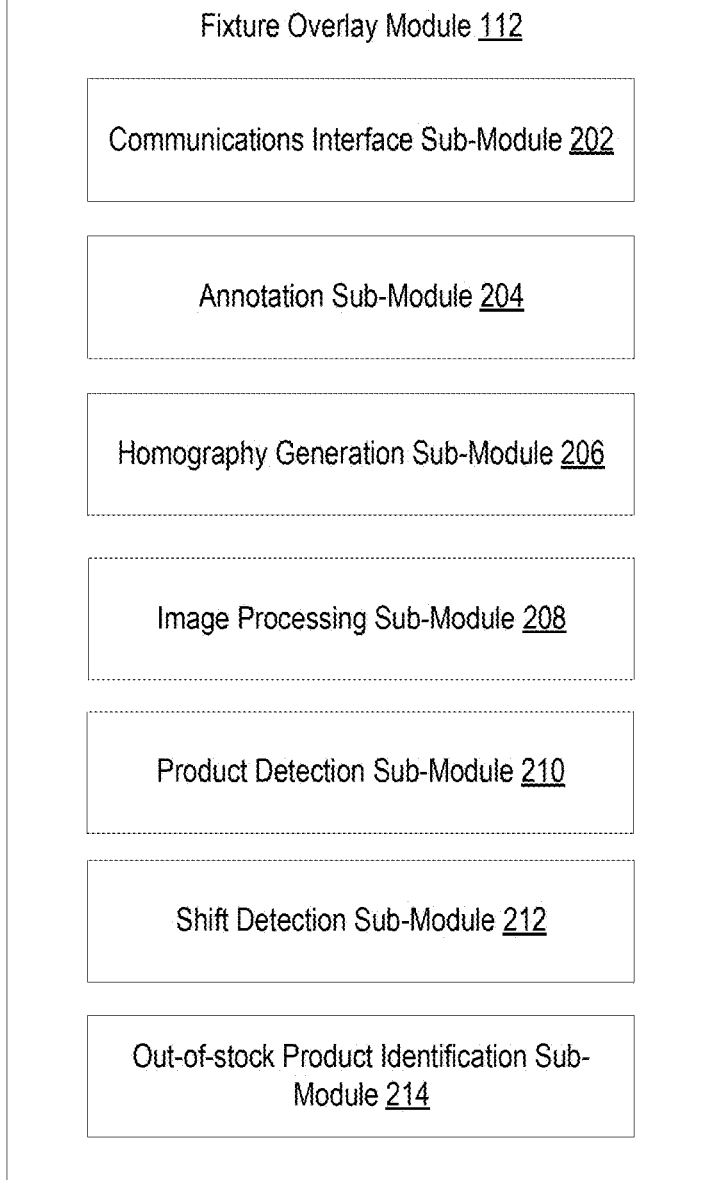
FIG. 2 illustrates an example configuration of the fixture overlay module of the fixture overlay system of FIG. 1.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The current process of replenishing empty shelves in stores includes store employees periodically walking through the aisles of the store to identify empty shelf space, identifying the missing products, identifying misplaced items, restocking the missing products and returning the misplaced items to its location. The process may be labor-intensive, inconsistent and time-consuming.

In general, the subject matter of the present disclosure relates to automatically detecting empty spaces on retail store shelves, and identifying the missing product(s), thereby allowing the shelf space to be reorganized, replenished, and/or restocked as necessary. For example, stores may use shelf-mounted imaging devices to capture images of shelves across the aisle from the imaging devices. The images captured by the imaging devices may be pre-processed to de-warp images and stitch together multiple images in order to retrieve an image that captures a full width of a shelf. A trained product detection model may be used to detect and add bounding boxes enclosing each of the products on the shelves and empty shelf locations within the pre-processed image. The products that are out-of-stock within the pre-processed images as identified by the product recognition model may be identified by comparing the position of the empty space within the image to pre-existing planogram data. While algorithms such based on recognition of product features may sometimes be used to map the image to the planogram data, such algorithms may not always be accurate and may also require continuous tuning.

The present disclosure relates to a fixture overlay algorithm that identifies the out-of-stock product by relying on shelf fixture start and end coordinate data points on an image to map the captured image to pre-existing planogram data. The present fixture overlay disclosure detects the start and stop shelf fixture positions for each of the shelves within the shelf image and uses the detected shelf fixture points to map the shelf image to the planogram coordinates.

For example, initially, when the cameras are mounted, an initialization process is performed. During the initialization process, annotators may manually mark start and end positions of shelf fixtures for each shelf included within the shelf image that the particular camera captures. Since the camera position and the shelf/shelf fixture positions do not typically change each time the camera captures a shelf image, the annotated shelf fixture start and stop positions from the initialization process may be used to map the shelf image coordinates to the planogram coordinates. In case the camera position of the shelf/fixture position is altered, a re-initialization process, including manual annotations of the start and stop shelf fixture positions may be required in order to accurately map the shelf image to the planogram.

Once the shelf fixture start and end positions are identified, the disclosed fixture overlay system and method computes a planar transformation homography between the image space coordinates and the planogram space coordi-nates. For example, an image processing homography algo-rithm, may be used to estimate the homography matrix between the shelf image and the planogram. Once the homography matrix is computed, the homography matrix may be applied to any point within the planogram to identify the corresponding x-y coordinates within the shelf image.

Upon identifying an empty region within the shelf image using an object detection algorithm, the fixture overlay solution may be applied to map the shelf image coordinates associated with the empty region to the corresponding coordinates within the planogram in order to identify the product itself.

FIG. 1 illustrates an example fixture overlay system 100. In some examples, the fixture overlay system 100 ensures that an out-of-stock item on a shelf in a retail store is detected, the missing item identified and an alert is deployed to an employee of the retail store identifying the missing item and shelf such that the retail store employee may replenish the item. The fixture overlay system 100 includes one or more imaging devices 102, a user electronic com-puting device 104, a network 108, a server computer 110 and one or more datastores 114. In some examples, the server computer 110 may include a fixture overlay module 112. More, fewer or different modules can be used.

In some examples, the one or more imaging devices 102 may include one or more imaging devices that may be shelf-mountable and can be used to capture images of the opposite-facing shelf. The one or more imaging devices may be configured to capture high-definition images so that size, color, and textual details associated with the products on the opposite-facing shelf are distinguishable. The one or more imaging devices 102 may include fish-eye lenses in order to capture wide shelf areas. The one or more imaging devices 102 may be battery-powered in order to make installation of the one or more imaging devices 102 on store shelves easier.

The one or more imaging devices 102 may be configured to capture images periodically during the day. For example, the one or more imaging devices 102 may be configured to capture 4-10 images per day in order to preserve battery and extend battery life to 1-2 years. The number of images captured per day and the battery life may be variable. The one or more imaging devices 102 may support network connectivity, whereby the imaging device 102 may connect to the server computer 110 through a wireless network, such as network 108 and transmit the captured images or receive instructions regarding the capture of images or image device settings. Other types of connectivity to the server computer 110 are also possible.

In other examples, the one or more imaging devices 102 may also include high-resolution camera that are used in a studio setting to capture reference images of each or a subset of product that is stocked in the store. The one or more imaging devices 102 may further include one or more vision sensors that are configured within point-of-sale cameras, store employees' handheld devices or other cameras within the store.

In some examples, user electronic computing device 104 is an electronic computing device of the user. For example, the user electronic computing device 104 may receive voice or text messages from the fixture overlay module 112 regarding out-of-stock items on store shelves.

In some examples, the electronic computing device 104 can be a desktop computer, a laptop computer, a mobile electronic computing device such as a smartphone or a tablet computer. The electronic computing device permits the user to access the server computer 110 over a network 108. In some examples, the users of the electronic computing device may include employees of the store that is monitoring the shelves for missing products. Although a single user electronic computing device 104 is shown, the example stock availability system 100 may allow hundreds, or more computing devices to connect to the server computer 110.

In some examples, the fixture overlay application 106 may be a web application or mobile application that can interface with the fixture overlay module 112. For example, the fixture overlay application 106 may be used by a user to add manual annotations to the fixture start and stop positions within acquired images during the initialization of the one or more imaging devices 102. The use of the fixture overlay application 106 to add manual annotation information to images is described in more detail in relation the annotation sub-module 204 in FIG. 2.

The fixture overlay application 106 may also receive notifications and display details regarding out-of-stock items within the store shelf on a display screen associated with the user electronic computing device 104. Further, the fixture overlay application 106 may be able to receive requests, retrieve and display the latest, as well as a historical list of images captured by the imaging device 102. The fixture overlay application 106 may also include one or more selections that allow users to make adjustments to the operations performed by the one or more imaging devices 102 and fixture overlay module 112.

In some examples, the network 108 is a computer network, such as the Internet. The user on user electronic computing device 104 and the one or more imaging devices 102 can access the server computer 110 via the network 108.

In an example, the server computer 110 may be a server computer of an enterprise or organization that is a retailer of goods. However, the server computer 110 may include server computers of other types of enterprises as well. Although a single server is shown, in reality, the server computer 110 can be implemented with multiple computing devices, such as a server farm or through cloud computing. Many other configurations are possible. In some examples, the server computer 110 may be located at a central server that is located away from the retailer location. In other examples, the server computer 110 may be located at the retail store location itself.

In one example, the fixture overlay module 112 receives and processes images of the store shelves and detects and identifies any missing items. As discussed in more detail later herein, the fixture overlay module 112 may analyze the images received from the one or more imaging device 102 to detect the placement of products within the shelf and identify the empty shelf spaces. Once the empty shelf locations are identified, the fixture overlay module 112 identifies the products that should be located within the identify empty shelf locations. The fixture overlay module 112 may then send an alert to the user electronic computing device 104 in the form of a voice or text message or send a notification to the fixture overlay application 106. The fixture overlay module 112 is described in further detail in relation to FIGS. 2-6.

The example datastore(s) 114 may include one or more electronic databases that can store one or more data tables that includes data associated with the enterprise. The fixture overlay module 112 may store and retrieve data in the datastore(s) 114 via the network 108. The datastore 114 may be maintained by the enterprise or organization itself or be maintained by one or more external, third-parties associated with the enterprise. The datastore 114 can be accessed by the server computer 110 to retrieve relevant data.

FIG. 2 illustrates an example configuration of the fixture overlay module 112 of the fixture overlay system 100 of FIG. 1. As detailed in relation to FIG. 1, the server computer 110 includes the fixture overlay module 112, which in turn may be implemented using one or more sub-modules. The one or more sub-modules of the fixture overlay module 112 may communicate with the datastore 114 through the network 108. For example, the sub-modules of the fixture overlay module 112 may transmit data to be stored in the data store 114 and receive data stored in the datastore 114.

In some examples, the disclosed fixture overlay module 112 may include a communications interface sub-module 202, an annotation sub-module 204, a homography generation sub-module 206, an image processing sub-module 208, a product detection sub-module 210, a shift detection sub-module 212, and an out-of-stock product identification sub-module 214. More or fewer sub-modules may be used to implement the fixture overlay module 112.

In some examples, the communications interface sub-module 202 is configured to receive input data and send output data. In some examples, the communications interface sub-module 202 is configured to receive and send data to the datastore 114 through the network 108. For example, the communications interface sub-module 202 may receive images from the imaging device 102 periodically, at scheduled time intervals throughout the day, via wireless communication between the imaging device 102 and the server computing device 110. Upon receiving the one or more images from the imaging device, the server computer 110 may store the images in the datastore 114.

In some examples, where the server computer 110 is a central server computer that is located away from the retailer location where the imaging devices 102 are located, the received images may be saved in the server computer 110 or the datastore 116 with tags to identify the retailer location, the aisle number, the shelf number, the camera number, date and time associated with the image. The communications interface sub-module 202 of the fixture overlay module 112 may periodically, at scheduled time intervals, access the stored images in the server computer 110 or the datastore 114 via communications through the network 108, to retrieve images for further processing of the images using one or more of the other sub-modules of the fixture overlay module 112.

In other examples, where the server computer 110 is a local server computer that is located at the same retailer location as the location of the imaging devices 102, the received images may be saved in the server computer 110 with tags to identify the aisle number, the shelf number, the camera number, date and time associated with the image. The stored images may be used by other sub-modules of the fixture overlay module 112 to access the images for further processing The communications interface sub-module 202 may also send out messages, notifications or other types of communication to the user electronic computing device 104. For example, after detecting and identifying missing products, as further described in relation to the out-of-stock product identification sub-module 214, the communications interface sub-module 202 may send one or more text messages, push notifications or other types of communications to the user electronic computing device 104 directly or to the fixture overlay application 106. The text messages, notifications or other types of communications may include identifying information associated with one or more of: the imaging device, store, aisle, shelf, identification information related to the missing product. Other types of information may also be part of the communication from the communications interface sub-module 202.

The annotation sub-module 204 is configured to receive one or more reference images of the shelf from the imaging device 102 when the imaging device 102 is initialized or when the position of the imaging device 102 has accidentally or intentionally shifted as determined by the shift detection sub-module 212, described in detail below and present the received reference images form manual annotation. For example, the fixture overlay module 112 uses manual annotations of shelf fixture positions as a guide to map an image of a shelf to the corresponding planogram information. Since the shelf/shelf fixtures are fixed in position and the imaging device, after installation, is also fixed in position, the manual annotation of the images to indicate where the start and stop shelf fixture positions are may only need to be performed when the imaging device is first installed and every time the imaging device 102 is accidentally or intentionally moved or shifted.

Upon receiving the one or more reference images of the shelf, the annotation sub-module 204 may, via the communication interface sub-module 202, transmit the received reference images to the fixture overlay application 106 on the user electronic computing device 104 for manual annotation and receive the annotated reference images from the fixture overlay application 106 via the user electronic computing device 104 once the user has completed annotating the images. Upon receiving the annotated reference images from the user electronic computing device 104, the annotation sub-module 204 may store the annotated reference images in the data store 114. The stored annotated reference images may later be retrieved and used by the out-of-stock product identification sub-module 214, as described in detail below.

For example, upon receiving the reference images of the shelf from the fixture overlay module 112, the fixture overlay application 106 may cause the display of the reference images on a display screen associated with the user electronic computing device 104 via a user interface. The fixture overlay application 106 may also include one or more tools that may help the user with the manual annotation process. For example, the fixture overlay application 106 may include tools to mark an image with visual indicators, such as color, text, or shapes that may be overlaid on top of the image to create the annotated reference image. The fixture overlay application 106 may also include tools to determine and store the x-y coordinates associated with each of the annotations or marks added to the image.

For example, the user can use the one or more tools associated with the fixture overlay application 106 to mark the start and stop locations of the shelf fixtures within the received reference images. For example, a shelf fixture may include any hardware that supports the shelf and keeps it falling down. Shelf fixture may include brackets, screws, vertical support walls, etc. Upon the user indicating, using an input via the user interface, that the user has completed creating the annotated reference images, the fixture overlay application 106 may directly transmit the annotated reference images to the data store 114 for storage or may transmit the annotated reference images to the annotation sub-module 204 of the fixture overlay module 112 and the annotation sub-module 204 may transmit the annotated reference images to the data store 114 for storage. An example annotated reference image of a shelf is described in greater detail in relation to FIG. 3.

The homography generation sub-module 206 may be configured to create a homography transformation matrix by mapping the annotated reference images to a pre-existing planogram image corresponding to the same shelf locations as captured by the imaging devices 102 for the reference images. A planogram is an image of the shelf that provides a visual blue-print for where products should be displayed within the shelf. For example, a planogram may include an image of the shelf with boundaries denoting the positions within the shelf where each product should be stocked, wherein each bounded positions within the planogram image may be tagged with an identifier of the product that should be stocked within the bounded position.

Based on the mapping between the annotated reference images and the corresponding planogram image, the homography generation sub-module 206 may be configured to generate a planar homography transformation matrix. A planar homography is a transformation that occurs between two planes. In other words, planar homography is the mapping between two planar images. Typically, a planar homography transformation is represented by a 3×3 planar homography transformation matrix in a homogeneous coordinates space. Using the homography transformation matrix, any point in one image may be mapped to a corresponding point in another image.

For example, the calculation of the co-ordinates for a point within a second image that corresponds to coordinates for a particular point within a first image using a planar homography transformation matrix may be represented as follows:

$$\begin{bmatrix} x_2 \\ y_2 \\ 1 \end{bmatrix} = H \begin{bmatrix} x_1 \\ y_1 \\ 1 \end{bmatrix} = \begin{bmatrix} h_{00} & h_{01} & h_{02} \\ h_{10} & h_{11} & h_{12} \\ h_{20} & h_{21} & h_{22} \end{bmatrix} \begin{bmatrix} x_1 \\ y_1 \\ 1 \end{bmatrix} \qquad \text{Equation (1)}$$

wherein, $(x_1, y_1)$ is a point within a first figure, $(x_2, y_2)$ is a corresponding point within a second figure and H is the homography transformation matrix that, when applied to the x-y coordinates associated with a point within the first image, results in the x-y coordinates associated with a corresponding point within the second image. The homography transformation matrix (H) is represented by the following 3×3 matrix in equation 1:

$$H = \begin{bmatrix} h_{00} & h_{01} & h_{02} \\ h_{10} & h_{11} & h_{12} \\ h_{20} & h_{21} & h_{22} \end{bmatrix}$$

To calculate the homography transformation matrix between two images, four corresponding points between the two images is needed. In the case of the transformation between the annotated reference images and the planogram image, the annotated fixture start and stop points from the annotated references images and the start and stop points of fixtures within the planogram image may be used to calculate the homography transformation matrix. In some examples an open-source computer vision homography algorithm may be used to automatically calculate the homography transformation matrix based on the annotated fixture positions within the annotated reference images and the marked fixture positions within the planogram image. The calculated homography transformation matrix may be applied to any point within an image of the shelf space to identify the corresponding x-y coordinates within the planogram and vice versa. Once the homography transformation matrix is computed, the homography transformation matrix may be stored in the data store 114 for use by the out-of-stock product identification sub-module 214 to identify products that are out-of-stock within the shelves.

In some examples, the image processing sub-module 208 is configured to perform image processing on the images received from the imaging device 102. For example, after the installation process associated with imaging devices 102, the manual annotation process to mark the fixture start and stop positions as described in relation to the annotation sub-module 204 and the homography transformation matrix generation process, as described in relation to the homography generation sub-module 206 are completed, the imaging devices 102 may be operational to detect out of stock images as further described in relation to sub-modules 208-214 of the fixture overlay module 112. As part of the out-of-stock detection process, the imaging device 102 may capture images of the shelf periodically throughout the day.

The images captured by the imaging devices 102 may be warped due to the angle and type of imaging device lens. In addition, due to the length of the shelf, a single image from a single imaging device may not be enough to capture the image of the entire shelf. Thus, multiple images from multiple imaging devices 102 may be needed to fully capture the image of a shelf.

Prior to detecting products within the image, or identifying a detected product or empty product space, the images received by the communications interface sub-module 202 from the imaging device 102 may be processed to de-warp and stitch together images in order to arrive at a single de-warped image of the full shelf. The processed image may be stored in the server computer 110 or the datastore 114 depending on whether the server computer 110 is local to the retail location or a central server computer.

In some examples, the product detection sub-module 210 may be configured to analyze the processed image produced by the image processing sub-module 204 and detect the presence of individual objects within the processed image by identifying the boundaries of the objects. For example, the processed image may be retrieved from the server 110 or datastore 114 and analyzed to detect the presence of individual objects within the processed image. Objects within an image may be detected using an image detection architecture. For example, the Cascade R-CNN is an object detection architecture that works well in recognizing individual products within images of store shelves filled with products. Other types of object detection architectures can also be used in detecting products within the processed images from the image processing sub-module 204. The method of detecting products within a store shelf is described in Rong et al., "A Solution to Product detection in Densely Packed Scenes", 2020.

For example, once the image is analyzed and individual products within the images are detected, the product detection sub-module 210 may draw a bounding box around the boundaries of the product. The bounding boxes may help the fixture overlay module 112 to recognize a group of pixels within the image as belonging to a single product.

In other examples, bounding boxes may also be drawn around empty shelf spaces that is meant to be occupied by an object, but does not include any objects. For example, the same object detection model or another object detection model may be used to detect whether any of the detected spaces within the shelf image that is enclosed within a bound box is empty or occupied by an object. If a space within the shelf is determined to be empty, the product detection sub-module 210 may tag the bounding box associated with the empty shelf space as belonging to an out-of-stock object.

As described below, the out-of-stock product identification sub-module 214 may use the tag information to identify the missing object. Other ways of identifying individual products within the processed image and empty spaces within the shelf image are also possible.

The shift detection sub-module 212 may be configured to detect any shifts to the position of the imaging devices 102. For example, the shift detection sub-module 212 may compare the vertical position of the bounding boxes within the product/empty space detected images generated by the product detection sub-module 210 to the vertical position of marks on the annotated images received and stored by the annotation sub-module 204 in order to determine whether the imaging devices 102 experienced any shifts in positions.

When the imaging device experiences a shift, typically the imaging device 102 experiences both a horizontal and vertical shift in position. By detecting vertical shifts in the position of the imaging device 102, a shift in position of the imaging device 102 can be assumed.

The shift detection sub-module 212 may retrieve the annotated images associated with the same imaging devices from the data store 114. The shift detection sub-module 212 may determine the x-y coordinates of each of the annotation marks indicating start and stop positions within the annotated images. Based on the x-y coordinate information, the shift detection sub-module 212 may determine the vertical position of each row of shelves within the annotated images. Thus, the y-coordinates of each row of shelving may be estimated based on the x-y coordinate information of the annotation marks within the annotated images.

The shift detection sub-module 212, upon receiving the product/empty space detected images from the product detection sub-module 210, may determine the vertical positions of each object positioned on a shelf within the product/empty space detected images received from the product detection sub-module 210. For example, the horizontal bounding box lines corresponding to each bounding box enclosing a product or an empty shelf space may be estimated to indicate the top and bottom vertical positions of a product or empty space within the product/empty space detected images received from the product detection sub-module 210.

The shift detection sub-module 212 my compare the vertical positions of each row of shelving units within the annotated images to the vertical position of each of the products and/or empty spaces within the product/empty space detected images. If the shift detection sub-module 212 determines that the vertical position of at least one of the products and/or empty spaces within the product/empty space detected images is such that the product or empty space may not align to fit within the vertical position of each row of shelving unit within the annotated image, the shift detection sub-module 212 may determine that at least one of the imaging devices 102 may have been shifted.

Upon determining that at least one of the imaging devices 102 may have been shifted, the shift detection sub-module 212 may notify the user electronic computing device 104 directly or through the fixture overlay application 106 that a re-annotation of the shelf fixture start and stop positions must be manually performed by a user for the fixture overlay module 112 to continue to detect out-of-stock products accurately.

Alternatively, if the shift detection sub-module 212 does not detect any shifts with the imaging devices 102, the product/empty space detected images from the product detection sub-module 210 may be transmitted to the out-ofstock product identification sub-module 214 in order to proceed with the identification of the out-of-stock product.

The out-of-stock product identification sub-module 214 may be configured to identify the out-of-stock products within the images from the imaging device 102. For example, the out-of-stock product identification sub-module 214 may receive the product/empty space detected images from the product detection sub-module 210 and identify the empty spaces within the image, as tagged by the product identification sub-module 214.

For each determined empty space within the product/empty space detected image, the out-of-stock product identification sub-module 214 may apply the homography transformation matrix that was generated by the homography generation sub-module 206 and stored in the data store 114, in order to determine the positional coordinates within the planogram image that corresponds to the coordinates associated with the empty space within the product/empty space detected image from the product detection sub-module 210.

For example, the out-of-stock product identification sub-module 214 may identify each of the empty shelf spaces tagged by the product detection sub-module 210. For each identified empty shelf space, the out-of-stock product identification sub-module 214 may determine an x-y coordinate that is located within the bounding box corresponding to the empty shelf space. In some examples, the x-y coordinate may be a center of the bounding box corresponding to the empty shelf space. In other examples, the x-y coordinate may be another point within the bounding box corresponding to the empty shelf space.

Upon determining an x-y coordinate associated with the empty shelf space, the out-of-stock product identification sub-module 214 may apply the homography transformation matrix as calculated and stored in the data store 114 by the homography generation sub-module 206 to the determine the x-y coordinates within the planogram image that corresponds to the x-y coordinate associated with the empty shelf space from the product/empty space detected images.

Once the corresponding x-y coordinates within the planogram image is determined, the out-of-stock product identification sub-module 214 may determine the identity of the product associated with the corresponding x-y coordinate within the planogram image by consulting data associated with the planogram image. For example, the planogram image, may include bounding boxes to indicate the positions within the image where a product is supposed to be stocked. The planogram image may also include tags associated with each bounding box that includes the identifier information associated with the product that is supposed to be positioned within the bounding box. All x-y coordinates within the planogram image may be associated with the same product identifier information as the product identifier associated with the bounding box that encompasses the x-y coordinate. Thus, the out-of-stock product identification sub-module 214 determines the identity of the product by determining the product identifier that is associated with the corresponding x-y coordinate within the planogram image.

Upon determining the identity of the product that is out-of-stock, and thus missing from the shelf image, the out-of-stock product identification sub-module 214 may send a notification or an alert to the user electronic computing device 104 via the communications interface sub-module 202. The user electronic computing device 104 may subsequently display the notification or alert using a voice or text message on the user electronic computing device 104 or display the notification or alert within the fixture overlay application 106 for a user. The notification or alert may include a shelf identifier that corresponds the shelf on which the product is out-of-stock, an aisle identifier that corresponds to the aisle at which the shelf is located within, and a product identifier. The product identifier may include the name of the product, an image of the product packaging, the brand name associated with the product. The user upon receiving the notification or alert may then be able to restock the product within the shelf.

Figure 3:
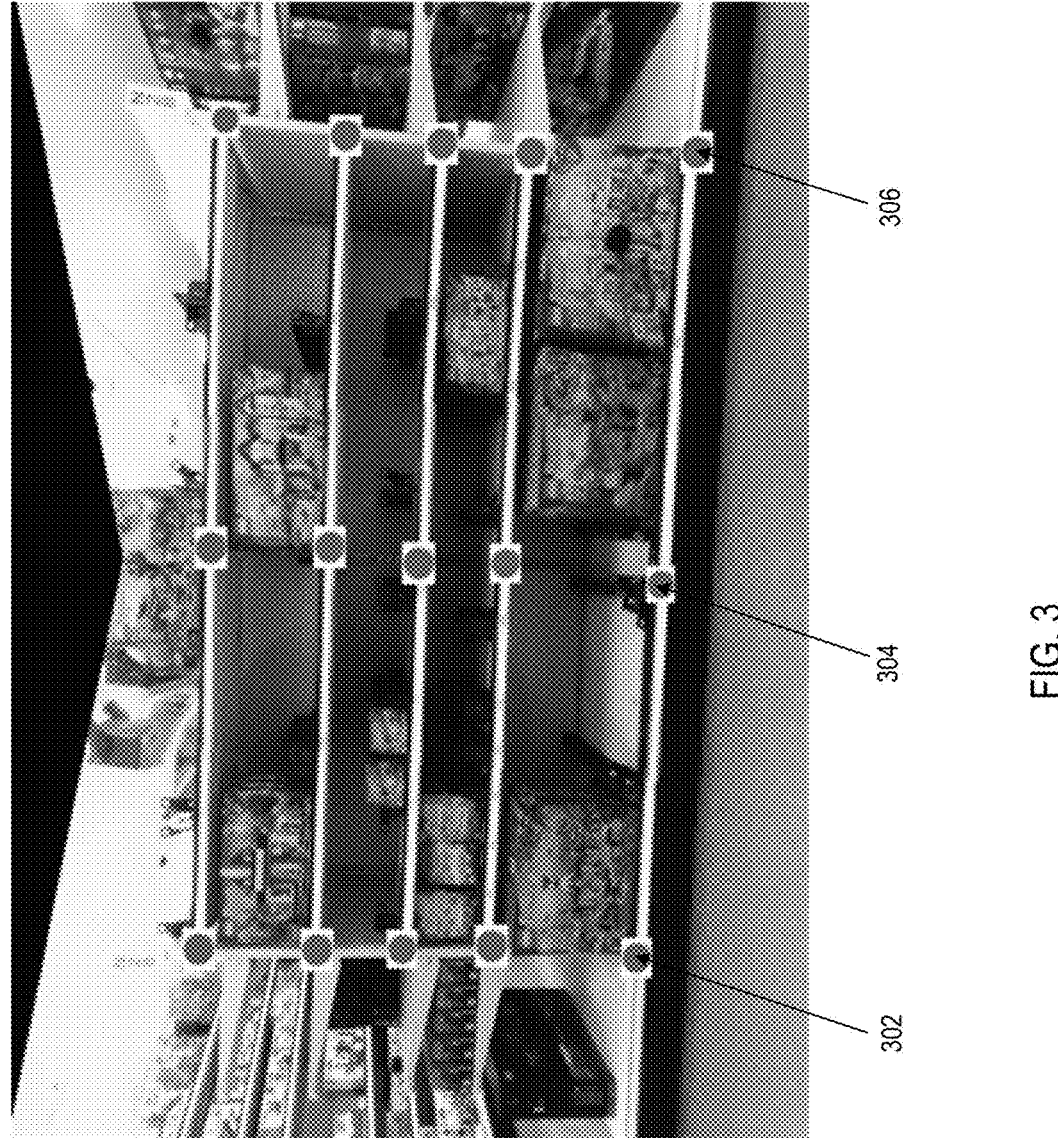
FIG. 3 illustrates an example annotated shelf image 300 that has been annotated using the fixture overlay system of FIG. 1.

FIG. 3 illustrates an example annotated shelf image 300 that has been annotated using the fixture overlay system 100 of FIG. 1.

The example annotated shelf image 300 is an image of a shelf within a retail store that has been pre-processed to de-warp and stitch together multiple images using the image pre-processing sub-module 208 from FIG. 2. The example annotated shelf image 300 includes 5 shelves that contain various products. The example annotated shelf image 300 includes annotations to indicate the start and stop positions of each of the shelves. For example, the start and stop positions of the shelf may be marked by fixtures, such as brackets, screws, or other hardware.

In some examples, the pre-processed image may be transmitted to the fixture overlay application 106, where the fixture overlay application 106 may display the pre-processed image on a display screen associated with the user electronic computing device 104. The user may then manually annotate the image using markings to denote the start and stop positions of each of the shelves. In addition to the start and stop positions, the user may also annotate other points within the shelf that is distinguishable due to the placement of shelving hardware. In the example annotated shelf image 300, the marker 302 denotes the start position of the bottom shelf, the marker 304 denotes the mid-point of the shelf as determined by the placement of the shelf brackets, and the marker 306 denotes the stop position of the bottom shelf. The example annotated shelf image 300 may be used in the mapping of the shelf image to the planogram image, as further described in relation to FIG. 4.

FIG. 4 illustrates an example side-by-side comparison of an annotated shelf image 402 and an example planogram image 404 as used by the fixture overlay system of FIG. 1 during a planogram mapping process.

The example annotated shelf image 402 includes 5 shelves with annotations denoting start, midpoint and stop positions of each of the shelves. For example, the bottom left marker 406 denotes the bottom left start position of the bottom shelf, the top left marker 408 denotes the top left start position of the bottom shelf, the bottom right marker 410 denotes the bottom right stop position of the bottom shelf and the top right marker 412 denotes the top right stop position of the bottom shelf.

In some examples, the shelf positions of a planogram image may be pre-tagged. In other examples, the shelf positions may be determined based on the corners of the bounding boxes as references. In the example planogram image 404, the planogram bottom left marker 414 denotes the bottom left start position of the bottom shelf within the planogram image, the planogram top left marker 416 denotes the top left start position of the bottom shelf within the planogram image, the planogram bottom right marker 418 denotes the bottom right stop position of the bottom shelf within the planogram image and the planogram top right marker 420 denotes the top right stop position of the bottom shelf within the planogram image.

The homography generation sub-module 206 may map the example annotated shelf image 402 to the example planogram image 404 and generate a homography transformation matrix (as described above in relation to FIG. 2) using the x-y coordinates associated with each of the markers: the bottom left marker 406; the top left marker 408; the bottom right marker 410; and the top right marker 412, within the example shelf image 402 and the x-y coordinates associated with each of the markers: the planogram bottom left marker 414; the planogram top left marker 416; the planogram bottom right marker 418; and the planogram top right marker 420, within the example planogram image 404.

The out-of-stock product identification sub-module 214 of the fixture overlay module 112 may determine the planogram position 424 within the example planogram image 404 that corresponds to the empty space 422 within the example annotated shelf image 402 by applying the homography transformation matrix generated by the homography generation sub-module 206 to the empty space 422. Once the out-of-stock product identification sub-module 214 determines the planogram position 424 that corresponds to the empty space 422, the out-of-stock product identification sub-module 214 may identify the product corresponding to the planogram position 424 by determining the product identifier associated with the bounding box within which the planogram position 424 is located.

FIG. 5 illustrates an example method 500 of generating a homography transformation matrix using the fixture overlay system 100 of FIG. 1. The example method 500 may be configured to be executed upon initialization of the imaging device 102 or upon a determination that the imaging device 102 has been shifted in position. For example, the example method 500 may generate a homography transformation matrix for reference images captured by the imaging device 102. The generated homography transformation matrix may be stored in the data store 114 and repeatedly used in identifying out-of-stock products, as described further in relation to FIG. 6, as long as the position of the imaging device 102 does not shift after the homography transformation matrix has been calculated. The example method 500 may need to be repeated if and when a shift in the position of the imaging device 102 is detected.

In example operation 502 of the example method 500, the fixture overlay module 112, via the communications interface sub-module 202, may receive one or more reference images from the imaging device 102 of a shelf or a portion of a shelf within a retail store. The reference images may be received by the fixture overlay module 112 via wireless communication directly from the one or more imaging devices 102 or the fixture overlay module 112 may receive the images following a request by the communications interface sub-module 202 to retrieve the reference images from the datastore 114 or server computer 110. In some examples, the one or more imaging devices 102 may be wirelessly connected to the server computer 110 and may send, and for the fixture overlay module 112 to receive, the one or more reference images through wireless communication via the network 108.

In example operation 504, the image processing sub-module 208 of the fixture overlay module 112 may pre-process the reference images received in operation 502. For example, the image processing sub-module 208 may de-warp and de-skew the one or more reference images received in operation 502. In addition, in cases where a plurality of reference images covering different portions of the shelf are received by the communications interface sub-module 202 in operation 502, the image processing sub-module 208 may stitch the plurality of reference images together to produce a single reference image that depicts the entire shelf image. Upon completing the de-warping and de-skewing processes, the image processing sub-module 208 may store the pre-processed reference image in the datastore 114 or server computer 110. The operations of de-warping, de-skewing and stitching together images is further described in relation to FIG. 2.

In example operation 506, the annotation sub-module 204 of the fixture overlay module 112 may present the pre-processed reference image to the user for manual annotation of shelf fixture locations within the pre-processed reference image. For example, the annotation sub-module 204 may be configured to retrieve the pre-processed reference image from the data store 114 and send the pre-processed reference image to the fixture overlay application 106 on the user electronic computing device 104 for manual annotation.

The fixture overlay application 106 may receive the pre-processed reference image from the fixture overlay module 112 and display the pre-processed reference image on a user interface on a display screen associated with the user electronic computing device 104. In addition, the fixture overlay application 106 may also present one or more annotation tools that the user may be able to use to manually annotate the pre-processed reference image. For example, the one or more annotation tools may include a marker that can be used to add marks to the pre-processed reference image to indicate shelf fixture positions within the pre-processed reference image. In some examples, adding marks may include adding a visual indicator to the pre-processed reference image, such as a color, shape, or text. The fixture overlay application 106 may also include tools to determine and store the x-y coordinates associated with each of the annotations or marks added to the image.

The user may use one or more of the annotation tools presented by the fixture overlay application 106 to mark the shelf fixture positions within the pre-processed reference image to create an annotated reference image. For example, a shelf fixture may include any hardware that supports the shelf and keeps it falling down. Shelf fixture may include brackets, screws, vertical support walls, etc. The shelf fixture positions may be used as a reference point to indicate the shelf start and shelf stop positions within the pre-processed reference image. Once the user has completed the manual annotation process of adding markers to the start and stop positions of the shelves within the pre-processed reference image, the user may select an input to indicate that the annotation process is completed. Upon receiving an indication from the user that the annotation process is completed, the fixture overlay application 106 may transmit the annotated reference image to the data store 114 for storage.

In example operation 508, the homography generation sub-module 206 of the fixture overlay module 112 may generate a homography transformation matrix using the annotated reference image and a planogram image. For example, the homography generation sub-module 206 may retrieve a planogram image and the annotated reference image created in operation 506 from the data store 114. The homography generation sub-module 206 may then map the retrieved annotated reference image to the planogram image to generate a homography transformation matrix.

For example, a homography transformation matrix between two images may be generated if at least four corresponding points between the two images is known. The annotated reference image includes markers that indicate start and stop positions of shelves within the image, including the x-y coordinates of each of the markers. Typically, the x-y coordinates of shelf start and stop positions within a planogram image may also be tagged and known. Using four such known coordinates that corresponds between the annotated reference image and planogram, the homography generation sub-module 206 may generate a homography transformation matrix. For example, an open source computer vision homography calculation algorithm may be used to calculate a homography transformation matrix between the annotated reference image and the planogram image. The calculation of a homography transformation matrix is described in greater detail in relation to FIG. 2.

In example operation 510, the homography generation sub-module 206 of the fixture overlay module 112 may store the generated homography transformation matrix in the data store 114 for use by the fixture overlay module 112 in identifying out-of-stock products as described in further detail in relation to FIG. 6. For example, the homography generation sub-module 206, may transmit the generated homography transformation matrix from operation 508 to the data store 114 via the communications interface sub-module 202 of the fixture overlay module 112.

FIG. 6 illustrates an example method 600 of identifying an out-of-stock product using the fixture overlay system 100 of FIG. 1. In example operation 602, the fixture overlay module 112, via the communications interface sub-module 202, may periodically receive one or more images from the imaging device 102 of a shelf or a portion of a shelf within a retail store. After the installation process of the one or more imaging devices 102 and the generation of the homography transformation matrix according to example method 500 is completed, the one or more imaging devices 102 may be setup to periodically capture images of the shelves in order to automatically identify out-of-stock products within the shelves.

The images may be received by the fixture overlay module 112 via wireless communication directly from the one or more imaging devices 102 or the fixture overlay module 112 may receive the images following a request by the communications interface sub-module 202 to retrieve the reference images from the datastore 114 or server computer 110. In some examples, the one or more imaging devices 102 may be wirelessly connected to the server computer 110 and may send, and the fixture overlay module 112 may receive, the one or more images through wireless communication via the network 108.

In example operation 604, the image processing sub-module 208 of the fixture overlay module 112 may pre-process the images received in operation 602. For example, the image processing sub-module 208 may de-warp, de-skew and stitch together a plurality of images from the one or more imaging devices in a process similar to that described in relation to operation 504 above.

In example operation 606, the product detection sub-module 210 of the fixture overlay module 112 may detect objects within the pre-processed imaged produced in operation 604. For example, the product detection sub-module 210 may retrieve the processed image from the data store 114 or the server computer 110 and the image of the shelf may be analyzed by the product detection sub-module 210 to detect individual products within the image using an object detection algorithm. In some examples, a Cascade R-CNN algorithm may be used in detecting individual objects within the image, a bounding box may be added to the image to enclose the boundaries of the individual objects. In other examples, other object detection algorithms may be used. Once an object is detected within the image, a bounding box may be added to the image to enclose the boundaries of the image. In addition to the object detection algorithm, the product detection sub-module 210 may also use an empty shelf space detection algorithm that may be trained to recognize empty shelf space, such as through a background modeling process, to detect and tag empty shelf space within the image as well. The detection of objects and empty shelf spaces within the pre-processed image is described further in relation to FIG. 2.

In example operation 608, the shift detection sub-module 212 of the fixture overlay module 112 may detect any shifts to the position of the imaging devices 102. When any of the one or more imaging devices 102 experience a shift, typically the imaging device 102 experiences both a horizontal and vertical shift in position. By detecting vertical shifts in the position of the imaging device 102, a shift in position of the imaging device 102 can be assumed.

For example, the shift detection sub-module 212 may receive the pre-processed, objected detected images with bounding boxes created in example operation 606 from the product detection sub-module 210. In addition, the shift detection sub-module 212 may also retrieve the annotated reference images created in operation 506 and stored in the data store 414.

To detect shifts in the position of the one or more imaging devices 102, the shift-detection sub-module 212 may compare the vertical boundaries of the bounding boxes within the received pre-processed, object detected images from operation 606 to the vertical boundaries of the bounding boxes in the annotated reference images created in operation 506. For example, if the shift detection sub-module 212 determines that the vertical position of at least one of the boundary boxes encompassing a product or empty space within the pre-processed, objected detected image from operation 606 does not align to fit within the vertical position of each row of shelving unit within the annotated image, the shift detection sub-module 212 may determine that at least one of the imaging devices 102 may have been shifted. The process of detecting shifts with the one or more imaging devices 102 is described in further detail in relation to FIG. 2.

If the shift detection sub-module 212, in example operation 608, determines that at least one of the one or more imaging devices 102 may have been shifted, the example operation 608 may proceed with executing example operation 610. Otherwise, if the shift detection sub-module 212, in example operation 608, determines that the one or more imaging devices 102 have not been shifted, the example operation 608 may proceed with executing example operation 612.

In example operation 610, the shift detection sub-module 212, upon determining that at least one of the one or more imaging devices has shifted in positions in relation to the position at which the reference images were captured in operation 502, may proceed with re-generating and storing a new homography transformation matrix based on new manual annotations. For example, upon the shift detection sub-module 212 determining that at least one of the one or more imaging devices has shifted in position in relation, the shift detection sub-module 212 may transmit a notification to the user electronic computing device 104 directly or through the fixture overlay application 106 that a re-annotation of the shelf-fixture start and stop positions must be manually performed by a user and a new homography transformation matrix must be re-calculated based on the re-annotated references image in order to accurately identify the out-of-stock products. Based on the notification, a user may physically readjust the one or more imaging devices that is experiencing a shift in position and restart the initialization process described in example operations 502-510.

Thus, in example operation 610, the fixture overlay module 212, including the annotation sub-module 204 and the homography generation sub-module 206, may be triggered to execute example operations 502-510 from FIG. 5 in order to re-capture reference images based on the re-adjusted positions of the one or more imaging devices, re-annotate the re-captured reference images, re-generate the homography transformation matrix based on the re-annotated reference images and store the re-generated homography transformation matrix in place of the previously generated homography transformation matrix. Upon completion of the re-initialization process associated with the one or more imaging devices 102 through operations 502-510, the example operation 610 may proceed to example operation 602 in order to restart the example method for identifying out-of-stock products.

In example operation 612, upon determining that none of the one or more imaging devices has shifted in position in relation to the positions at which the reference images were captured in operation 502, the out-of-stock product identification sub-module 214 of the fixture overlay module 112 may retrieve the homography transformation matrix from the data store 114. The homography transformation matrix from the data store 114 may be generated and stored by the homography generation sub-module 206 when the one or more imaging devices 102 are initialized or upon determining that the one or more imaging devices 102 have shifted in position.

In some examples, in addition to the homography transformation matrix, the out-of-stock product identification sub-module 214 may also retrieve the planogram image from the data store 114 for identifying the out-of-stock product in example operation 614 described above.

In example 614, the out-of-stock product identification sub-module 214 of the fixture overlay module 112 may determine the identity of stock product within the pre-processed, object identified image as created in example operation 606. For example, the out-of-stock product identification sub-module 214 of the fixture overlay module 112 may receive the pre-processed, object identified image from operation 606 and determine the empty shelf space(s) identified within the pre-processed, object identified image as identified by the product detection sub-module 210 in operation 606.

For each empty shelf space within the pre-processed, object identified image, the out-of-stock product identification sub-module 214 may determine an x-y coordinate within the bounding box enclosing the empty shelf position. In some examples, the x-y coordinate may be the center point of the bounding box. In other examples, the x-y coordinate may be another point within the bounding box.

Upon identifying a point within the bounding box enclosing an empty shelf space, the out-of-stock product identification sub-module 214 may apply the retrieved homography transformation matrix from example operation 612 in order to determine a point within the planogram image that corresponds to the determined point from the pre-processed, object identified image. For example, if the determine point within the pre-processed, object identified image is denoted by the x-y coordinates: $(x_1,y_1)$, the corresponding x-y coordinates within the planogram image, $(x_2,y_2)$ may be calculated by applying the retrieved homography transformation matrix using Equation (1), reprinted below:

$$\begin{bmatrix} x_2 \\ y_2 \\ 1 \end{bmatrix} = \begin{bmatrix} h_{00} & h_{01} & h_{02} \\ h_{10} & h_{11} & h_{12} \\ h_{20} & h_{21} & h_{22} \end{bmatrix} \begin{bmatrix} x_1 \\ y_1 \\ 1 \end{bmatrix}$$

Upon determining the x-y coordinates associated with the planogram image, $(x_2,y_2)$, that corresponds to the empty shelf space from the pre-processed, object identified image, the out-of-stock product identification sub-module 214 may determine the product identifier associated with the bounding box that encompasses the x-y coordinates within the planogram image. The determined product identifier may be identified by the out-of-stock product identification sub-module 214 as the identity of the product that is missing, and thus out-of-stock, from the empty shelf space. The process of identifying the out-of-stock product is further described in relation to FIG. 2.

In example operation 616, the out-of-stock product identification sub-module 214 may send out a notification to the user electronic computing device 104 directly or send out a notification via the fixture overlay application 106, to alert the user that a product is out-of-stock within the shelf image and thus needs re-stocking. In some examples, the notification may be a voice or text message. In other examples, the notification may be other types of visual or audio alerts. The notification may include enough information for the user to understand which product needs re-stocking on which shelf of the retail store. Thus, the notification may include details including, the name of the product, the brand name of the product, an image of the product packaging, the location of the product within the storage facility, whether the retail store itself has additional stock of the product, an identifier for the aisle where the product needs to be re-stocked, an identifier for the shelf where the product needs to be re-stocked. The process of notifying the user regarding out-of-stock products is described in further detail in relation to FIG. 2.

Figure 7:
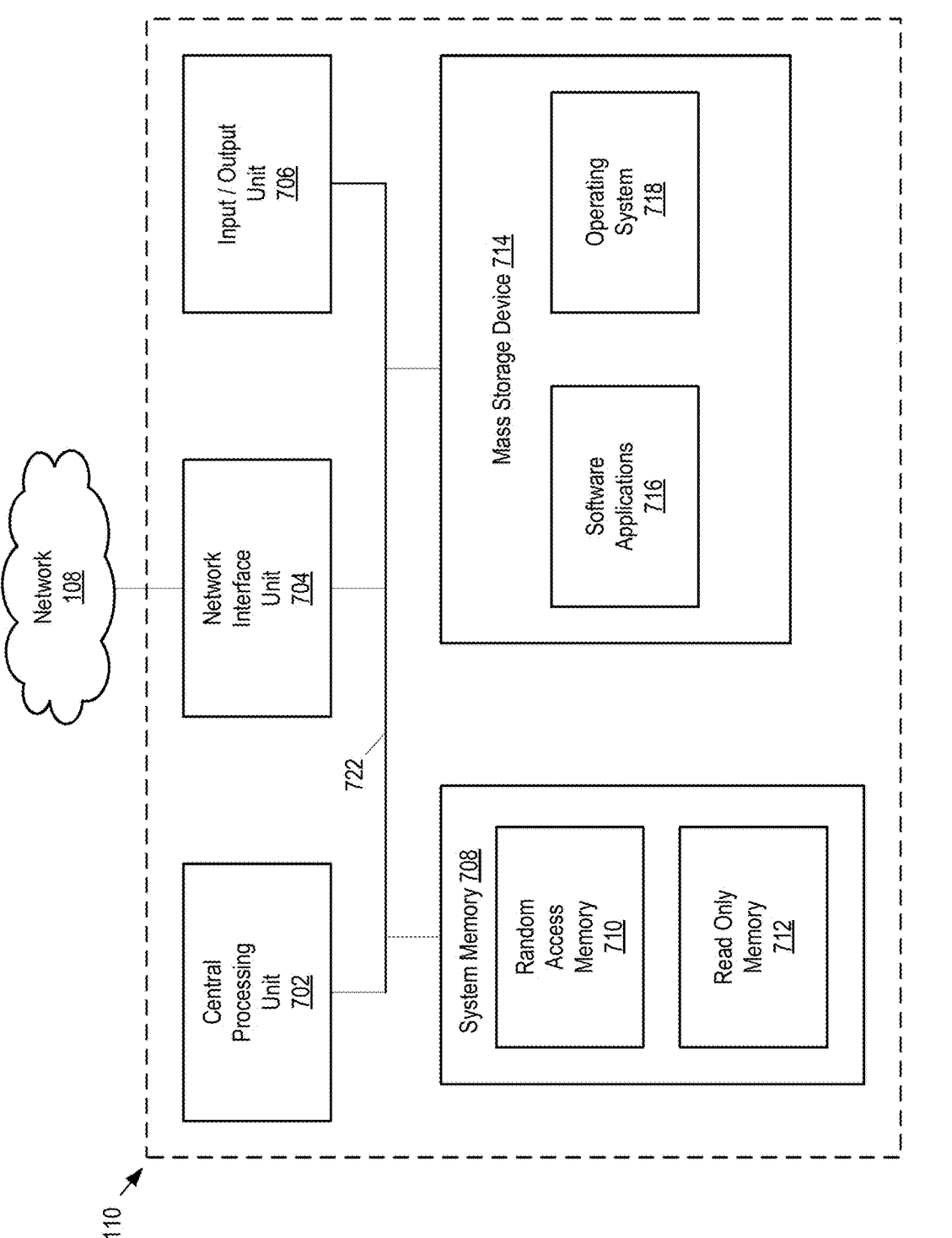
FIG. 7 illustrates example physical components of the computing device of FIG. 1.

FIG. 7 illustrates example physical components of the computing devices of FIG. 1. As illustrated in the example of FIG. 9, the server computer 110 includes at least one central processing unit ("CPU") 702, a system memory 708, and a system bus 722 that couples the system memory 708 to the CPU 702. The system memory 708 includes a random-access memory ("RAM") 710 and a read-only memory ("ROM") 712. A basic input/output system that contains the basic routines that help to transfer information between elements within the server computer 110, such as during startup, is stored in the ROM 712. The server computer 110 further includes a mass storage device 714. The mass storage device 714 is able to store software instructions and data 716 associated with software applications 716. Some or all of the components of the server computer 110 can also be included in user electronic computing device 104.

The mass storage device 714 is connected to the CPU 702 through a mass storage controller (not shown) connected to the system bus 722. The mass storage device 714 and its associated computer-readable data storage media provide non-volatile, non-transitory storage for the server computer 110. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central processing unit can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server computer 110.

According to various embodiments of the invention, the server computer 110 may operate in a networked environment using logical connections to remote network devices through the network 108, such as a wireless network, the Internet, or another type of network. The server computer 110 may connect to the network 108 through a network interface unit 704 connected to the system bus 722. It should be appreciated that the network interface unit 704 may also be utilized to connect to other types of networks and remote computing systems. The server computer 110 also includes an input/output controller 706 for receiving and processing input from a number of other devices, including a touch user interface display screen, or another type of input device. Similarly, the input/output controller 706 may provide output to a touch user interface display screen or other type of output device.

As mentioned briefly above, the mass storage device 714 and the RAM 710 of the server computer 110 can store software instructions and data associated with software applications 716. The software instructions include an operating system 718 suitable for controlling the operation of the server computer 110. The mass storage device 714 and/or the RAM 710 also store software instructions, that when executed by the CPU 702, cause the server computer 110 to provide the functionality of the server computer 110 discussed in this document. For example, the mass storage device 714 and/or the RAM 710 can store software instructions that, when executed by the CPU 702, cause the server computer 110 to display received data on the display screen of the server computer 110.

What is claimed is:

1. A method for determining an identity of an out-of-stock product within a shelf image, the method comprising:

receiving the shelf image from an imaging device;

retrieving, from a data store, a planogram image that corresponds to the shelf image;

retrieving, from the data store, a homography transformation matrix that maps the shelf image to the planogram image, wherein the homography transformation matrix is calculated based on a reference shelf image that includes a plurality of annotations that each marks one or more shelf fixtures within the reference shelf image;

detecting one or more empty shelf spaces within the shelf image;

generating a bounding box surrounding each of the one or more empty shelf spaces;

determining whether the imaging device has shifted in position since capturing the reference shelf image by comparing a vertical position of the bounding box of at least one of the one or more empty shelf spaces to a vertical position of at least one of the plurality of annotations;

upon determining that the imaging device has not shifted in position, for each empty shelf space of the one or more empty shelf spaces, determining an image coordinate corresponding to the empty shelf space, wherein the image coordinate is an x-y coordinate corresponding to the position of the empty shelf space within the shelf image;

determining a planogram coordinate within the planogram image that corresponds to the image coordinate from the shelf image by applying the homography transformation matrix to the image coordinate; and determining the identity of the out-of-stock product associated with the empty shelf space by determining a product identifier associated with the planogram coordinate.

2. The method of claim 1, further comprising:

receiving the reference shelf image from the imaging device;

receiving the plurality of annotations;

for each of the plurality of annotations, identifying a corresponding location within the planogram image;

calculating the homography transformation matrix by mapping the reference shelf image with the plurality of annotations to the planogram image; and storing the homography transformation matrix in the data store.

3. The method of claim 2, wherein the homography transformation matrix is calculated using the following equation:

$$\begin{bmatrix} x_2 \\ y_2 \\ 1 \end{bmatrix} = \begin{bmatrix} h_{00} & h_{01} & h_{02} \\ h_{10} & h_{11} & h_{12} \\ h_{20} & h_{21} & h_{22} \end{bmatrix} \begin{bmatrix} x_1 \\ y_1 \\ 1 \end{bmatrix},$$

wherein, $(x_1, y_1)$ corresponds to a location of one of the plurality of annotations within the reference shelf image, $(x_2, y_2)$ corresponds to a location within the planogram image that corresponds to the location of the one of the plurality of annotations within the reference shelf image and $$\begin{bmatrix} h_{00} & h_{01} & h_{02} \\ h_{10} & h_{11} & h_{12} \\ h_{20} & h_{21} & h_{22} \end{bmatrix}$$

is the homography transformation matrix that when applied to $(x_1, y_1)$ results in $(x_2, y_2)$.

4. The method of claim 2, wherein the plurality of annotations includes at least 4 annotations marking at least 4 different shelf fixture locations within the reference shelf image.

5. The method of claim 1, further comprising:

sending a notification to a user to re-stock the out-of-stock product, wherein the notification includes the product identifier.

6. The method of claim 1, further comprising:

upon determining that the imaging device has shifted in position, re-generating a new homography transformation matrix; and replacing the homography transformation matrix in the data store with the new homography transformation matrix.

7. The method of claim 1, wherein receiving the shelf image from the imaging device includes:

receiving a plurality of shelf images from a plurality of imaging devices;

de-warping each of the plurality of shelf images; and stitching together the plurality of shelf images to create the shelf image.

8. The method of claim 1, wherein detecting the one or more empty shelf spaces within the shelf image includes:

detecting the one or more empty shelf spaces using an object detection algorithm that is trained to detect empty shelf spaces.

9. The method of claim 1, wherein the imaging device is camera with a fixed position within a retail store.

10. A system for determining an identity of an out-of-stock product within a shelf image, the system comprising:

an imaging device;

a computing system comprising:

a processor; and a memory communicatively connected to the processor which stores program instructions executable by the processor, wherein, when executed, the program instructions cause the system to:

receive the shelf image from the imaging device;

retrieve, from a data store, a planogram image that corresponds to the shelf image;

retrieve, from the data store, a homography transformation matrix that maps the shelf image to the planogram image, wherein the homography transformation matrix is calculated based on a reference shelf image that includes a plurality of annotations that each mark one or more shelf fixtures within the reference shelf image;

detect one or more empty shelf spaces within the shelf image;

generate a bounding box surrounding each of the one or more empty shelf spaces;

determine whether the imaging device has shifted in position since capturing the reference shelf image by comparing a vertical position of the bounding box of at least one of the one or more empty shelf spaces to a vertical position of at least one of the plurality of annotations;

upon determining that the imaging device has not shifted in position, for each empty shelf space of the one or more empty shelf spaces, determine an image coordinate corresponding to the empty shelf space, wherein the image coordinate is an x-y coordinate corresponding to the position of the empty shelf space within the shelf image;

determine a planogram coordinate within the planogram image that corresponds to the image coordinate from the shelf image by applying the homography transformation matrix to the image coordinate; and determine the identity of the out-of-stock product associated with the empty shelf space by determining a product identifier associated with the planogram coordinate.

11. The system of claim 10, wherein the program instructions further cause the computing system to:

receive the reference shelf image from the imaging device during initial setup of the imaging device;

receive the plurality of annotations;

for each of the plurality of annotations, identify a corresponding location within the planogram image;

calculate the homography transformation matrix by mapping the reference shelf image with the plurality of annotations to the planogram image; and store the homography transformation matrix in the data store.

12. The system of claim 11, wherein the homography transformation matrix is calculated using the following equation:

$$\begin{bmatrix} x_2 \\ y_2 \\ 1 \end{bmatrix} = \begin{bmatrix} h_{00} & h_{01} & h_{02} \\ h_{10} & h_{11} & h_{12} \\ h_{20} & h_{21} & h_{22} \end{bmatrix} \begin{bmatrix} x_1 \\ y_1 \\ 1 \end{bmatrix},$$

wherein, $(x_1, y_1)$ corresponds to a location of one of the plurality of annotations within the reference shelf image, $(x_2, y_2)$ corresponds to a location within the planogram image that corresponds to the location of the one of the plurality of annotations within the reference shelf image and $$\begin{bmatrix} h_{00} & h_{01} & h_{02} \\ h_{10} & h_{11} & h_{12} \\ h_{20} & h_{21} & h_{22} \end{bmatrix}$$

is the homography transformation matrix that when applied to $(x_1, y_1)$ results in $(x_2, y_2)$.

13. The system of claim 11, wherein the plurality of annotations includes at least 4 annotations marking at least 4 different shelf fixture locations within the reference shelf image.

14. The system of claim 10, further comprising:

a user electronic computing device; and wherein the program instructions further cause the computing system to:

send a notification to the user electronic computing device to alert a user to re-stock the out-of-stock product, wherein the notification includes the product identifier.

15. The system of claim 10, wherein the program instructions further cause the computing system to:

upon determining that the imaging device has shifted in position, re-generate a new homography transformation matrix; and replace the homography transformation matrix in the data store with the new homography transformation matrix.

16. The system of claim 10, wherein to receive the shelf image from the imaging device includes to:

receive a plurality of shelf images from a plurality of imaging devices;

de-warp each of the plurality of shelf images; and stitch together the plurality of shelf images to create the shelf image.

17. The system of claim 10, wherein to detect the one or more empty shelf spaces within the shelf image includes to:

detect the one or more empty shelf spaces using an object detection algorithm that is trained to detect empty shelf spaces.

18. The system of claim 10, wherein the imaging device is camera with a fixed position within a retail store.

19. A system to alert a user to re-stock an out-of-stock product within a retail store shelf, the system comprising:

an imaging device;

a user electronic computing device;

a computing system comprising:

a processor; and a memory communicatively connected to the processor which stores program instructions executable by the processor, wherein, when executed, the program instructions cause the system to:

receive a reference shelf image from the imaging device during initial setup of the imaging device;

cause the display of the reference shelf image on the user electronic computing device;

receive, at the user electronic computing device, a plurality of manual annotations, wherein each annotation marks a shelf fixture location within the reference shelf image;

for each of the plurality of annotations, identify a corresponding location within a planogram image;

calculate a homography transformation matrix by mapping the reference shelf image with the plurality of annotations that each mark one or more shelf fixtures within the reference shelf image to the planogram image; and receive a shelf image from the imaging device;

detect one or more empty shelf spaces within the shelf image;

generate a bounding box surrounding each of the one or more empty shelf spaces;

determine whether the imaging device has shifted in position since capturing the reference shelf image by comparing a vertical position of the bounding box of at least one of the one or more empty shelf spaces to a vertical position of at least one of the plurality of annotations;

upon determining that the imaging device has not shifted in position, for each empty shelf space of the one or more empty shelf spaces, determine an image coordinate corresponding to the empty shelf space, wherein the image coordinate is an x-y coordinate corresponding to the position of the empty shelf space within the shelf image;

determine a planogram coordinate within the planogram image that corresponds to the image coordinate from the shelf image by applying the homography transformation matrix to the image coordinate;

determine the identity of the out-of-stock product associated with the empty shelf space by determining a product identifier associated with the planogram coordinate; and send a notification to the user electronic computing device to alert the user to re-stock the out-of-stock product, wherein the notification includes the product identifier.

20. The system of claim 19, wherein the homography transformation matrix is calculated using the following equation:

$$\begin{bmatrix} x_2 \\ y_2 \\ 1 \end{bmatrix} = \begin{bmatrix} h_{00} & h_{01} & h_{02} \\ h_{10} & h_{11} & h_{12} \\ h_{20} & h_{21} & h_{22} \end{bmatrix} \begin{bmatrix} x_1 \\ y_1 \\ 1 \end{bmatrix},$$

wherein, $(x_1, y_1)$ corresponds to a location of one of the plurality of annotations within the reference shelf image, $(x_2, y_2)$ corresponds to a location within the planogram image that corresponds to the location of the one of the plurality of annotations within the reference shelf image and $$\begin{bmatrix} h_{00} & h_{01} & h_{02} \\ h_{10} & h_{11} & h_{12} \\ h_{20} & h_{21} & h_{22} \end{bmatrix}$$

is the homography transformation matrix that when applied to $(x_1, y_1)$ results in $(x_2, y_2)$.

* * * * *